US012400819B2

(12) United States Patent
Guyot et al.

(10) Patent No.: US 12,400,819 B2
(45) Date of Patent: Aug. 26, 2025

(54) ELECTRICAL SWITCHING DEVICE HAVING AN AUXILIARY CONTACT

(71) Applicant: SAFRAN ELECTRICAL & POWER, Blagnac (FR)

(72) Inventors: Ludovic Guyot, Blagnac (FR); Jérôme Valire, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 18/723,217

(22) PCT Filed: Dec. 13, 2022

(86) PCT No.: PCT/FR2022/052332
§ 371 (c)(1),
(2) Date: Jun. 21, 2024

(87) PCT Pub. No.: WO2023/118691
PCT Pub. Date: Jun. 29, 2023

(65) Prior Publication Data

US 2024/0420911 A1 Dec. 19, 2024

(30) Foreign Application Priority Data

Dec. 22, 2021 (FR) ........................................ 2114269

(51) Int. Cl.
*H01H 85/30* (2006.01)
*H01H 39/00* (2006.01)
(Continued)

(52) U.S. Cl.
CPC ........ *H01H 85/306* (2013.01); *H01H 39/006* (2013.01); *H01H 85/042* (2013.01); *H01H 85/36* (2013.01)

(58) Field of Classification Search
CPC ......... H01H 85/30–306; H01H 39/006; H01H 85/042; H01H 85/36
See application file for complete search history.

(56) References Cited

U.S. PATENT DOCUMENTS 4,652,067 A * 3/1987 Lutzenberger ....... H01R 13/703 439/43
5,097,244 A 3/1992 Veverka et al.
(Continued)

FOREIGN PATENT DOCUMENTS

DE 102020104617 A1 5/2020

OTHER PUBLICATIONS

Search Report and Written Opinion issued in International Application No. PCT/FR2022/052332, mailed Mar. 28, 2023.
(Continued)

*Primary Examiner* — Jacob R Crum
(74) *Attorney, Agent, or Firm* — Bookoff McAndrews, PLLC

(57) ABSTRACT

Electrical cut-off device including a fuse used to open a power line in which a direct current circulates, a movable drawer connected to the fuse and capable, once the fuse is broken, of moving in a fixed chamber under the action of a compression spring mounted between the fixed chamber and the movable drawer, and an auxiliary contact whose fixed contact part is secured to the fixed chamber and movable contact part is secured to the movable drawer whose movement will cause the opening of the normally closed auxiliary contact.

11 Claims, 3 Drawing Sheets

(51) Int. Cl.

| | |
|---|---|
| ***H01H 85/042*** | (2006.01) |
| ***H01H 85/36*** | (2006.01) |

(56) References Cited

U.S. PATENT DOCUMENTS

| | | | | |
|---|---|---|---|---|
| 10,589,635 | B1 * | 3/2020 | Solodovnik | B60L 50/13 |
| 2012/0194317 | A1 * | 8/2012 | Vranicar | H01H 37/761 337/401 |
| 2013/0200984 | A1 * | 8/2013 | Matthiesen | H01H 37/761 337/186 |
| 2014/0266561 | A1 | 9/2014 | Horne | |
| 2017/0345602 | A1 * | 11/2017 | Yoon | H01H 85/17 |
| 2019/0252145 | A1 * | 8/2019 | Ehrhardt | H01H 37/765 |
| 2022/0013314 | A1 * | 1/2022 | Hierl | H01H 37/764 |

OTHER PUBLICATIONS

Search Report and Written Opinion issued in French Application No. 2114269, mailed Jul. 25, 2022.

* cited by examiner

[Fig. 1]
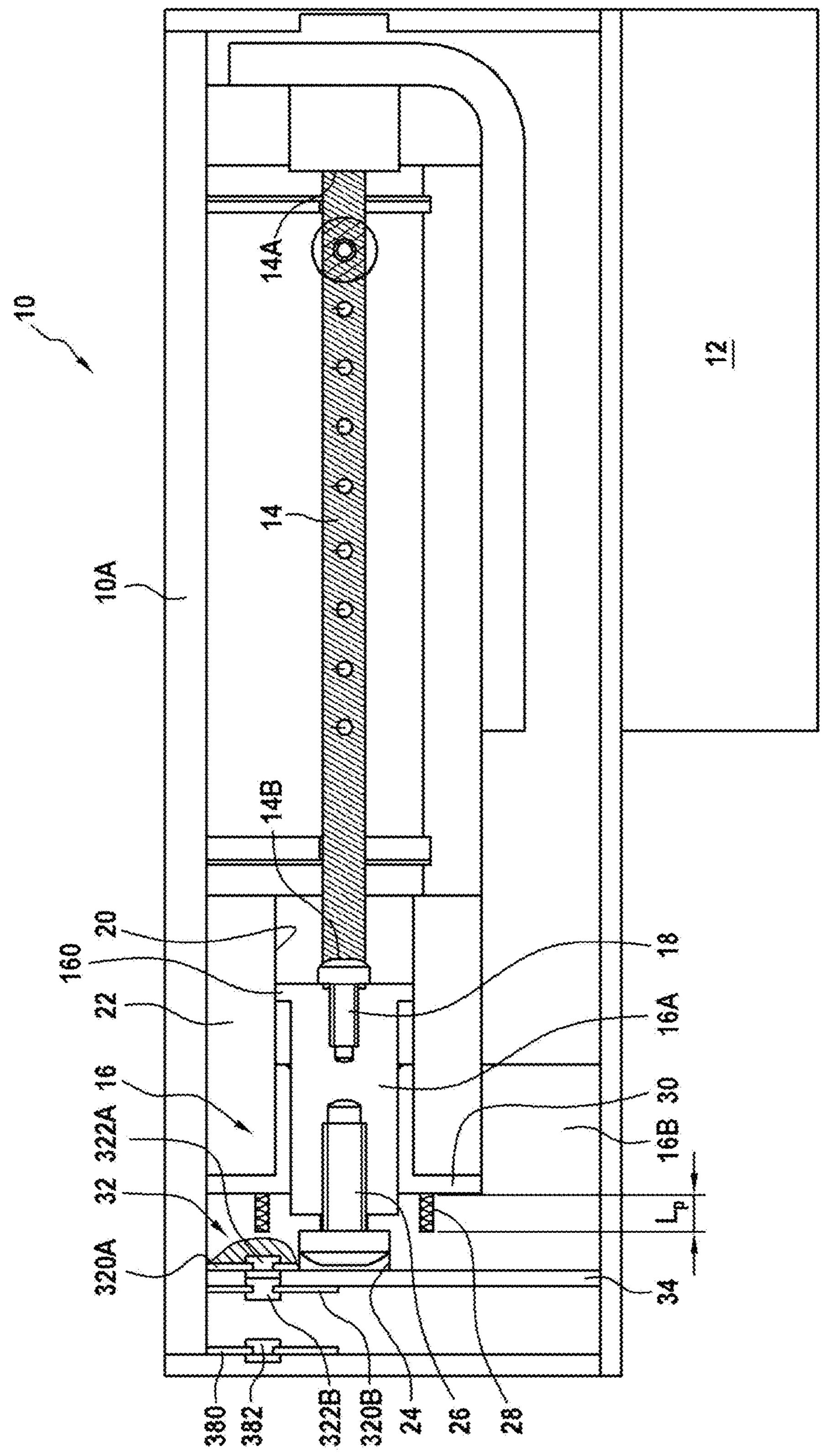

[Fig. 2]
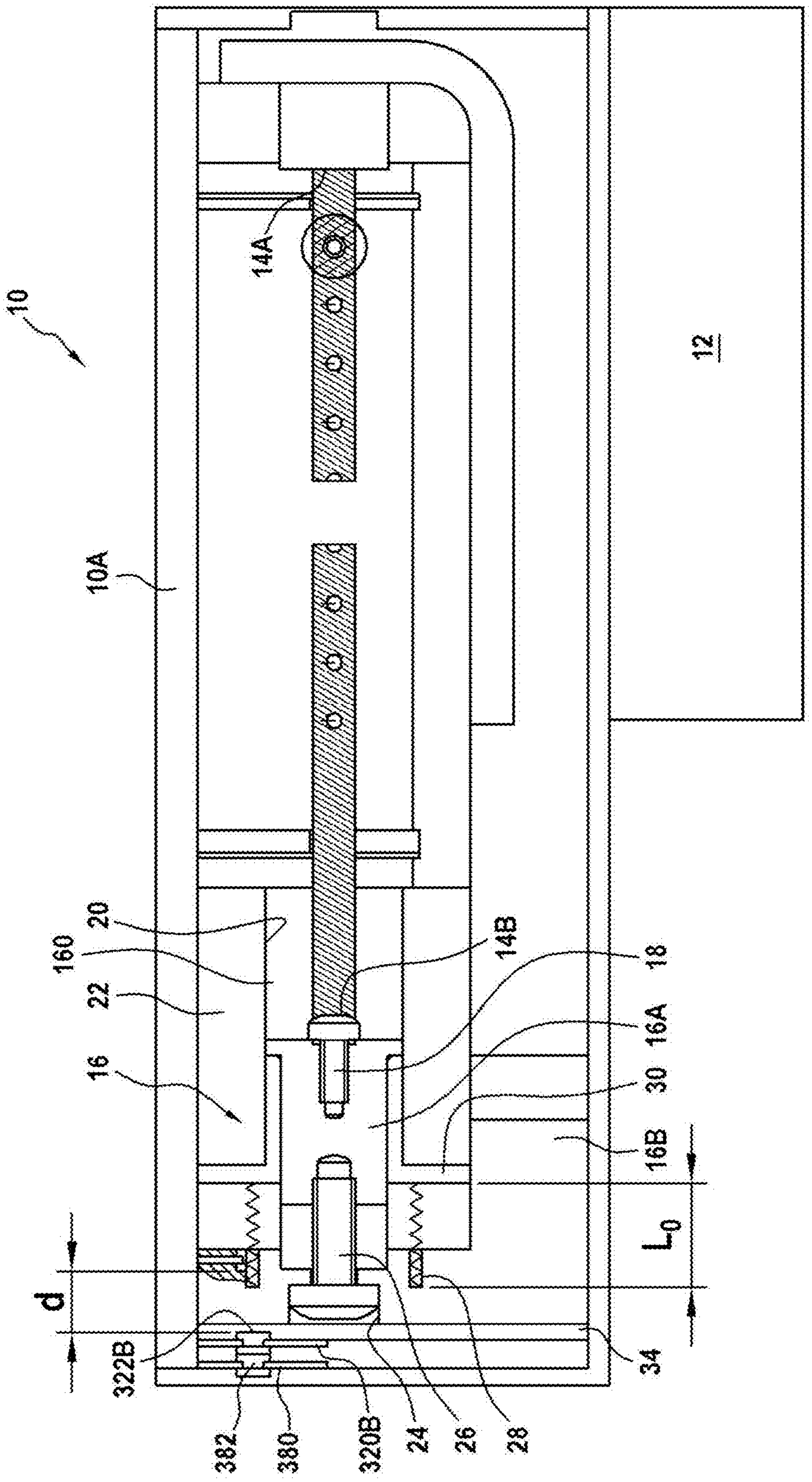

[Fig. 3]
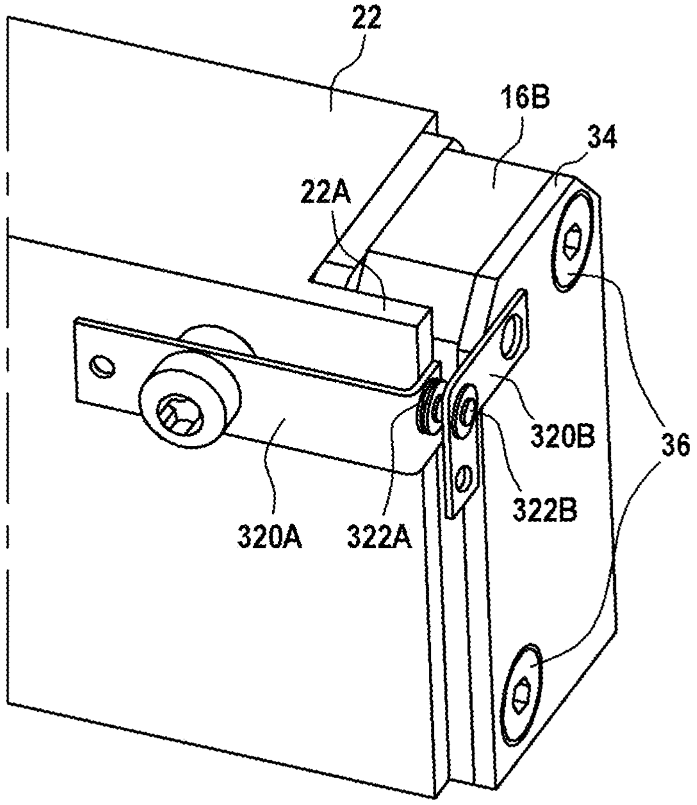

ELECTRICAL SWITCHING DEVICE HAVING AN AUXILIARY CONTACT

CROSS-REFERENCE TO RELATED APPLICATIONS

This is a National Stage Application under 35 U.S.C. § 371 of International Application No. PCT/FR2022/052332, filed Dec. 13, 2022, now published as WO 2023/118691 A1, which claims priority to French Patent Application No. 2114269, filed on Dec. 22, 2021.

TECHNICAL FIELD

The present invention relates to the general field of electrical cut-off devices for direct current, preferably high-voltage direct current (HVDC), supply networks and more particularly aircraft propulsion systems.

PRIOR ART

The electrical cut-off system known under the terms "pyrofuse" or "pyroswitch" is an assembly composed of a pyrotechnic actuator and of a fuse triggered by the actuator. It is used to open a power line in which a direct current circulates, in the event of a short circuit or excessive current. The pyrotechnic actuator then acts to help the fuse open the power line in extreme conditions by the combined action of the melting of the fuse element and mechanical action of stretching the fuse which contributes to breaking it. There are also electrical cut-off systems with mechanical actuator or others without any actuator.

If such devices are generally satisfactory, it is however difficult to make sure of the melting of the fuse or of the proper triggering of the actuator when it exists, as well as of a possible dormant failure of the device that cannot be operational without a fuse in good operating state during the opening of the power line.

DISCLOSURE OF THE INVENTION

The main aim of the present invention is therefore to ensure constant monitoring of the state of the fuse throughout its lifespan and whatever its mode of activation. Another aim is also to ensure that the auxiliary contact detecting this state has reached its limit.

These aims are achieved by an electrical cut-off device including a fuse used to open a power line in which a direct current circulates, characterized in that it further includes a movable drawer connected to the fuse and capable, once the fuse is broken, of moving in a fixed chamber under the action of a compression spring mounted between the fixed chamber and the movable drawer, and an auxiliary contact whose fixed contact part is secured to the fixed chamber and movable contact part is secured to the movable drawer whose movement will cause the opening of the normally closed auxiliary contact.

Advantageously, the auxiliary contact is galvanically isolated from the power line.

The addition of this auxiliary breakage detection circuit galvanically isolated from the power circuit ensures the function of monitoring the state of the fuse, regardless of its activation mode, short circuit or pyrotechnic or mechanical activation.

Preferably, the movable drawer is fixed to one end of the fuse by a first fixing screw.

Advantageously, the movable drawer is made up of a slide sliding in the fixed chamber and of a stopper bearing against the fixed chamber and fixed to the slide by a second fixing screw.

Preferably, the fixed and movable contact parts of the auxiliary contact are each constituted by a copper strip and a silver pad.

Advantageously, the movable contact part is mounted on an isolation plate fixed to the stopper by third fixing screws.

Preferably, the auxiliary contact is connected to a Sub-D connector in order to actuate an external signaling process.

According to one embodiment, the cut-off device includes a limit switch contact with a copper strip and a silver pad.

Preferably, the fuse is triggered by a pyrotechnic or mechanical actuator.

The invention also relates to a high-voltage direct current (HVDC) supply network including a cut-off device as mentioned above and an aircraft propulsion system including such a high-voltage direct current supply network.

BRIEF DESCRIPTION OF THE DRAWINGS

Other characteristics and advantages of the present invention will emerge from the description given below, with reference to the appended drawings which illustrate one exemplary embodiment devoid of any limitation and in which:

FIG. 1 is a sectional view in a passive position of a cut-off device in accordance with the invention, FIG. 2 is a sectional view in an active position of a cut-off device in accordance with the invention, and FIG. 3 is an outer perspective view of the cut-off device of FIGS. 1 and 2 at the level of its auxiliary contact.

DESCRIPTION OF THE EMBODIMENTS

The principle of the invention is based on the fact that as soon as an overcurrent passes through the fuse of the electrical cut-off device and melts it, a drawer provided with an auxiliary contact is no longer retained by this fuse and then moves into a chamber under the action of a pressurized compression spring and which thus returns to its free position, releasing the auxiliary contact, so as to signal the breakage of the fuse whose monitoring can thus be ensured.

FIGS. 1 and 2 show by way of example, in two different positions, an electrical cut-off device 10 consisting of a pyrotechnic or mechanical actuator 12 and of a fuse 14 triggered by the actuator, and used to open a power line in which a high-voltage direct current circulates. The pyrotechnic or mechanical actuator known per se is not detailed.

In the first position of FIG. 1, the cut-off device is at rest, the fuse 14 of the device is in perfect state and stretches between a first fixed end 14A and a second movable end 14B fixed to a movable drawer 16 by a first fixing screw 18. The drawer can move in translation in a housing 20 of a fixed chamber 22 mounted in the body 10A of the cut-off device. The movable drawer is advantageously made in two parts with a slide 16A and a stopper 16B. The slide 16A is movably mounted in translation in the housing 20 and is in the form of a shouldered shaft, the shoulder 160 being permanently located in the housing 20. The slide 16A has a first end fixed to the fuse 14 via the first fixing screw 18 and a second end fixed in a blind hole 24 of the stopper 16B via a second fixing screw 26. The stopper 16B fixed to the slide 16A by the second fixing screw 26 places under stress a compression spring 28 (which then has a length in place Lp) until being pressed against the fixed chamber 22 via a connecting ring 30 mounted in the housing 20 and whose thickness corresponds to that of the shoulder 160.

An auxiliary contact 32 whose fixed contact part 32A is secured to the fixed chamber 22 (more specifically to an offset part 22A of this fixed chamber visible in FIG. 3) and movable contact part 32B facing it is secured to the movable drawer 16 (more specifically directly to the stopper 16B or via an isolation plate 34 fixed by third fixing screws 36 to the stopper (visible in FIG. 3) depending on the nature of the material constituting this stopper), is provided to ensure the function of detecting the tearing (the melting) of the fuse whose movement via the slide 16A and the compression spring 28 will cause the opening of this normally closed auxiliary contact (NC) in the rest position of the cut-off device. Each fixed or movable contact part is made up of a copper strip 320A, 320B and of a silver pad 322A, 322B, the contacting of the two silver pads indicating the closure of the auxiliary contact. Note the galvanic isolation formed between this auxiliary contact and the power line due to the absence of a conductive connection therebetween.

The two copper strips of the two fixed and movable contact parts are connected by wiring to a Sub-D type connector (not represented) which makes it possible to read the state of the auxiliary contact and thus monitor and know the state of the fuse of the electrical cut-off device.

In the second position of FIG. 2, the fuse 14 has melted under the action of heat or broken for any other undesired reason and the slide 16A sliding in the fixed chamber 22 has therefore translated under the action of the compression spring 28 which then returns to its free length L0.

Indeed, this slide 16A secured to one end of the fuse 14 is able to be driven in translation under the action of release of this compression spring when the cut-off device 10 moves from its rest, therefore passive, position to an active operating position, bringing its shoulder 160 against the connecting ring 30 held by the compression spring 28 against the fixed chamber 22. The bearing face 162 of the stopper 16B is now separated from the fixed chamber against which it was bearing via the connecting ring 30, this separation setting in motion the normally closed auxiliary contact 32. The movable contact part 32B fixed to the stopper 16B is then set in motion and separates from the opposite fixed contact part 32A fixed to the fixed chamber 5, the auxiliary contact is then in the open position.

It will be noted that when the normally closed auxiliary contactor is, as illustrated, coupled with a normally open auxiliary contact (NO 38), made up of another copper strip 380 and of a silver pad 382, it is possible to ensure that the system has reached its limit under the action of the compression spring 28.

The invention claimed is:

1. An electrical cut-off device including a fuse used to open a power line in which a direct current circulates, wherein the electrical cut-off device further includes a movable drawer connected to the fuse and capable, once the fuse is broken, of moving in a fixed chamber under an action of a compression spring mounted between the fixed chamber and the movable drawer, and a normally closed auxiliary contact whose fixed contact part is secured to the fixed chamber and movable contact part is secured to the movable drawer whose movement will cause the opening of the normally closed auxiliary contact, wherein the normally closed auxiliary contact is galvanically isolated from the power line.

2. The cut-off device according to claim 1, wherein the movable drawer is fixed to one end of the fuse by a first fixing screw.

3. The cut-off device according to claim 1, wherein the normally closed auxiliary contact is connected to a Sub-D connector in order to actuate an external signaling process.

4. The cut-off device according to claim 1, wherein the fixed and movable contact parts of the normally closed auxiliary contact are each constituted by a copper strip and a silver pad.

5. The cut-off device according to claim 4, wherein the movable contact part is mounted on an isolation plate fixed to a stopper by third fixing screws.

6. The cut-off device according to claim 1, further including a limit switch contact with a copper strip and a silver pad.

7. The cut-off device according to claim 1, wherein the fuse is triggered by a pyrotechnic or mechanical actuator.

8. A high-voltage direct current (HVDC) supply network including a cut-off device according to claim 7.

9. An aircraft propulsion system including a high-voltage direct current supply network according to claim 8.

10. An electrical cut-off device including a fuse used to open a power line in which a direct current circulates, wherein the electrical cut-off device characterized in that it further includes a movable drawer connected to the fuse and capable, once the fuse is broken, of moving in a fixed chamber under an action of a compression spring mounted between the fixed chamber and the movable drawer, and a normally closed auxiliary contact whose fixed contact part is secured to the fixed chamber and movable contact part is secured to the movable drawer whose movement will cause the opening of the normally closed auxiliary contact, wherein the movable drawer is fixed to one end of the fuse by a first fixing screw.

11. An electrical cut-off device including a fuse used to open a power line in which a direct current circulates, wherein the electrical cut-off device characterized in that it further includes a movable drawer connected to the fuse and capable, once the fuse is broken, of moving in a fixed chamber under an action of a compression spring mounted between the fixed chamber and the movable drawer, and a normally closed auxiliary contact whose fixed contact part is secured to the fixed chamber and movable contact part is secured to the movable drawer whose movement will cause the opening of the normally closed auxiliary contact, wherein the movable drawer is made up of a slide sliding in the fixed chamber and of a stopper bearing against the fixed chamber and fixed to the slide by a second fixing screw.

* * * * *